3,005,031
PROCESS FOR CHLORINATING NITRO AROMATIC HYDROCARBONS
Martin E. Friedrich, Penns Grove, N.J., assignor to E. I. du Pont de Nemours and Company, Wilmington, Del., a corporation of Delaware
No Drawing. Filed Sept. 30, 1958, Ser. No. 764,246
9 Claims. (Cl. 260—646)

This invention is directed to the manufacture of chloronitroaromatic hydrocarbons by chlorinating nitroaromatic hydrocarbons. More particularly, the present invention is directed to overcoming the deleterious effect of water in the chlorination of such representative nitro bodies as nitrobenzene and nitrotoluene by conducting the chlorination in the presence of a phosphorus chloride.

Nitoaromatic hydrocarbons may be directly chlorinated in the nucleus, at moderate temperatures, in the presence of a catalyst to produce the corresponding chloronitro bodies; this known process, in general, involves introducing chlorine gas into a mixture of the nitro body and catalyst, at a temperature at least sufficient to maintain the reaction mixture fluid and stirrable, until the desired degree of chlorination is achieved as is determined, for example, by freezing point or specific gravity. Readily produced in this way, for example, are mono- and dichloronitrobenzene and nitrotoluenes, of value as intermediates to, for example, the corresponding chloroaromatic amines for use in the manufacture of a variety of products, e.g., azo dyes, pigments and agricultural chemicals such as herbicides.

The chlorination of a nitro body such as nitrobenzene is known to be retarded, even inhibited completely by the presence of extraneous substances, notably water and sulfuric acid. For example, Fierz-David and Blangey in "Fundamental Processes of Dye Chemistry" (1949) state (p. 117) that the chlorination of nitrobenzene in the laboratory requires careful operation and succeeds only if the reaction is carried out in the complete absence of water. As even traces of moisture prevent the chlorination or retard it excessively, they suggest that the apparatus and materials be thoroughly dried before use; for example, nitrobenzene is heated several hours at 80–100° C. with a stream of dry air going through it.

The chlorination process on a commercial scale is particularly troublesome primarily because of the difficulty and high cost involved in getting down to water levels that can be tolerated. The chlorination of nitrobenzene, for example, even under optimum conditions, is a relatively slow reaction, and it has been found that to achieve practical rates of chlorination the water content of the system should be reduced to below 0.02% by weight of the nitrobenzene. Even at these "trace quantity" water levels, the rate of chlorination is apt to be unpredictable.

The nitroaromatic hydrocarbons, as ordinarily produced in nitration processes, contain water in proportions which, though small by ordinary standards, are sufficient to retard or inhibit the chlorination reaction. To reduce the water content to only 0.02% and below is time-consuming and costly, and, not always successful because of the small proportions of water actually involved.

For example, topping crude nitrobenzene in a distillation column usually reduces the water content to an average of 0.2%. Topping with care or topping followed by distillation may provide distilled nitrobenzene containing only 0.02% water, sometimes less. Similarly topped and distilled o-nitrotoluene will usually average 0.02% water, sometimes higher, e.g. 0.07%. Further, these "low moisture" grades of nitrobody readily absorb moisture from the air, so that unless they are carefully protected immediately after distillation, their water contents may increase several fold to prohibitively high levels.

Further attempts to "dry" the nitro compounds by contacting them with solid desiccants such as calcium chloride or alumina gel have not been too successful, and usualy result in some loss of product. Starting with "dry" apparatus and materials does not, however, avoid the possibility of contamination during storage and during the chlorination itself. Such contamination can be particularly troublesome in humid weather: During chlorination, the removal of the HCl that is produced as a product of the reaction is conveniently facilitated by maintaining a slight vacuum on the gas exit line leading from the reactor; if the reactor is not completely air-tight, moist air may be pulled into the reactor and exert its retarding effect. Also, when a different nitro body, e.g. o-nitrotoluene replaces another e.g. nitrobenzene, for chlorination in a given reactor, the equipment usually has to be cleaned and washed, and as a result, despite attempts at careful drying of the equipment the first charge chlorinated in it shows a retarded rate of chlorination.

Another consequence of the retarding effect of water is that chlorine gas appears in the vent gases. This constitutes a serious health hazard unless adequate fume controls are installed. For this reason, attempts to force the reaction, to overcome the effect of water, by maintaining the usually more normal rate of chlorine feed are impractical.

Sometimes the retarding effect of water may be overcome by the addition of extra quantities of catalyst to the reactor, but, besides adding to the costs, this too is not always satisfactory and the reaction often proceeds below the normal rate.

It is an object of the present invention to provide an improved method of chlorinating nitroaromatic hydrocarbons whereby the deleterious effects of water are obviated. Another object is to avoid the necessity of starting with scrupulously dried materials and apparatus, as has been suggested heretofore in the chlorination of the nitroaromatic hydrocarbons.

These and other objects will be apparent in the specification and claims that follow.

More specifically, the present invention is directed to the nuclear chlorination of a nitroaromatic hydrocarbon, which reaction is characterized as being retarded by trace quantities of water, the improvement of conducting the chlorination in the presence of at least an approximate stoichiometric water-binding quantity of a phosphorus chloride.

According to the present novel process, introducing a phosphorus chloride, e.g. $PCl_3$, into the chlorination mass in quantity about sufficient to react with any water that may be present, completely overcomes the retarding and inhibiting effect of water. As a result, the rate of production of chlorinated nitroaromatic hydrocarbon is significantly increased and other important advantages and economies are achieved as discussed below.

The process of this invention is applicable to the chlorination of nitroaromatic hydrocarbons, such as the benzenoid substances exemplified by nitrobenzene and the mononitrotoluenes, to produce the corresponding ring chlorinated aromatic compounds. Nitro bodies containing up to about 0.5% water by weight have been successfully chlorinated in the presence of approximate stoichiometric water-binding quantities of $PCl_3$. The nitro bodies as ordinarily obtained by the conventional nitration and work-up procedures usually do not contain more than about 0.5% water, since the solubility of water in these substances is relatively low and gross amounts are readily separated therefrom by simple mechanical means. Reducing the water content to about 0.5% is therefore no problem. For example, p-nitrotoluene, recovered as the washed solid product from the nitration reaction, usually contains 0.2 to 0.3% water. However, for chlorination, its water content heretofore had to be reduced to below 0.02%. As stated earlier, even at these difficultly attainable low water levels, the reaction rate tends to be unpredictable and slow, with the result that production schedules are difficult to maintain. These difficulties are cleared up by the use of a phosphorus chloride according to the method of this invention.

The present novel method involves adding $PCl_3$ to the nitro body and catalyst in quantity commensurate with the water content of the system and conducting the chlorination in the usual way. Stoichiometrically, 2.54 parts by weight of $PCl_3$ are required for each part of water, based on the complete conversion of $PCl_3$ to $P(OH)_3$ and HCl. Usually a 25 to 100% excess over the stoichiometric quantity will be employed to ensure complete conversion of the water that may be present to innocuous products. Larger quantities may be used, e.g. approximately three (3) times the stoichiometric quantity; however, such higher quantities are usually considered unnecessary and wasteful. Normally, the quantity used will be based on the water content of the nitro compound, since the chlorine gas and the chlorination catalysts are easily made reasonably dry for the present purpose. However, it should be noted that it is now no longer necessary to rigorously dry all the materials in order to ensure the complete absence of water, as has been recommended heretofore. Of course, where feasible the introduction of inhibiting amounts of water along with these materials should be avoided, to minimize the cost involved in the use of additional quantities of $PCl_3$ to tie up such quantities of water.

It is preferred, in the present novel process, to employ the equipment and the reaction conditions (temperature, pressure and catalyst) that have been established for the known conventional process heretofore described.

A variety of substances are known catalysts for the chlorination of nitrobenzene and other aromatic nitro compounds. Most commonly used are iron (powdered), salts of iron such as ferric chloride, iodine, and their combinations. It is known, from other work in the literature, that chlorine converts iron to ferric chloride, and iodine to iodine chloride. The combinations of powdered iron and iodine, and of anhydrous ferric chloride and iodine are preferred.

The actual quantities of catalyst may vary widely, as described in the art. Relative to the conventional process however, the use of $PCl_3$ according to the method of the present invention permits the use of smaller quantities of catalyst. In general, the quantity of iron (or of ferric chloride in terms of its iron content) will range from about 0.1% to about 1.5% by weight of the nitro body; usually at least about 0.3% will be preferred and not more than about 0.5% needed. The quantity of iodine will normally correspond to 0.02 to 0.1%, and usually not more than 0.03% by weight of the nitro body. In general also, the weight ratio of iron to iodine will be in the range 5:1 to 100:1; and, usually 10:1 to 30:1.

Chlorination temperatures range from about room temperatures to 100° C., usually from 35° to 80° C., and are preferably such that the reaction mass is molten and easily stirred to facilitate contact with chlorine. With nitrobenzene and o-nitrotoluene, 40–50° C. is the preferred temperature range. With p-nitrotoluene, at least 60–65° C. is needed to keep the mass fluid.

To chlorinate, chlorine is simply passed into the reaction mixture of liquid nitro body, catalyst and phosphorus trichloride. Preferably, the reaction mass is mechanically agitated to aid in the mixing of the reactants and in the expelling of the hydrogen chloride formed in the reaction. The rate of feed depends on the means available for controlling the desired temperature of the reaction and on the capacity of the reaction medium to absorb and react with the chlorine being introduced. Thus, the rate will vary depending on the temperature employed and on the particular nitro compound and catalyst, including proportions of catalyst. Preferably, the rate of feed will be such that the preferred temperatures are easily maintained and no free chlorine appears in the hydrogen chloride exit gas stream. To promote removal of hydrogen chloride, a slight vacuum may be maintained, if desired, on the off-gas line exiting from the reactor. Elevated pressures are not necessary for operability. For reasons of economy, the pressure will be atmospheric or slightly below as indicated above.

It is also preferred, where possible, to exclude air from the reaction mass, as it has also been found that air has a retarding effect on the rate of chlorination. However, though air (oxygen)-free chlorine may be best from this standpoint, for economic reasons it is preferred to use chlorine obtained directly from the electrolysis of NaCl brine. Such chlorine, after being scrubbed with sulfuric acid and compressed, normally contains at least 95% chlorine and is generally satisfactory.

As known, catalyzed chlorination of nitro bodies such as nitrobenzene and nitrotoluene with about one molar equivalent of chlorine results in mixtures consisting principally of some unreacted nitro compound and its monochloro and dichloro products. Either the monochloro or dichloro products can be the major product depending mainly on the total amount of chlorine introduced. To obtain predominantly monochloronitrobenzene, for example, the reaction is continued until the product attains a specific gravity of about 1.3 to 1.35 at 40° C. To obtain more of the dichloro compound, the chlorination is continued to higher specific gravities; for example to 1.5 which will correspond to about 35% monochloro and 65% dichlorobenzene. The freezing point of the reaction mass also indicates the extent of chlorination. For the production of monochloro-p-nitrotoluene, for example, chlorine is fed until the reaction product has a freezing point of 52–53° C.

It should be understood that the present invention is not limited to any particular degree of chlorination or to whether the compound to be chlorinated is, for example, nitrobenzene or monochloronitrobenzene. It is concerned primarily with overcoming the retarding influence of water on those chlorinations that are so affected.

The examples below are representative and illustrate the process of the present invention together with the unexpected benefits discovered.

The chlorine gas referred to below was prepared by electrolyzing NaCl brine, scrubbing the product with sulfuric acid and compressing it. It averaged about 95–96% $Cl_2$, with the rest consisting essentially of carbon dioxide and air.

*Example 1*

A charge consisting of 35,000 lbs. of nitrobenzene containing 0.04% (14 lbs.) water, 100 lbs. of iron powder, 10 lbs. of iodine and 38 lbs. of phosphorus trichloride, and contained in a brick lined reactor was smoothly monochlorinated as follows:

The above mixture was agitated mechanically and a stream of chlorine gas passed into it through a feed pipe extending below the surface of the charge, whereupon the absorption of chlorine with liberation of heat and hydrogen chloride started almost immediately. The exiting hydrogen chloride was absorbed in a water trap comprised of a water-aspirator hooked to the off-gas line. The rate of feed of chlorine gas was adjusted so that no free chlorine appeared in the off-gas stream. The reaction mass absorbed the chlorine feed smoothly and was maintained between 40 and 50° C. by contact cooling coils. The chlorine feed was stopped after 48 hours, when the charge had attained a specific gravity of 1.35 at 40° C. The charge was removed from the reactor, washed with aqueous hydrochloric acid to yield the monochlorinate product.

In contrast, in a series of otherwise identical runs in which PCl₃ was omitted and in which nitrobenzene having water contents ranging from 0.005% to 0.04% was employed, the uptake of chlorine was slower and much less smooth: At least 60 hours and as long as 192 hours were required to obtain a product of specific gravity 1.35 at 40° C., and during these runs the chlorine feed had to be carefully monitored, and slowed down when free chlorine appeared in the off-gas stream; furthermore, in some of the runs, additional catalytic quantities of iron powder and iodine had to be added for the reaction to proceed.

Further, in the recovery of the product, once the desired degree of chlorination has been attained, the charge is thoroughly washed with aqueous hydrochloric acid (as noted above) to remove the remaining catalyst. How many such washes are needed depends on how much iron was used as catalyst. Relative to the conventional process, the process of this invention required less iron, as should be apparent from the above comparisons, and, as a result, fewer washes were necessary in the work up of the chlorinated product.

*Example II*

Similar improvements and economies were obtained as in Example I in the chlorination of p-nitrotoluene containing from 0.2% to 0.3% water by weight. In a typical run, a charge consisting of 4700 lbs. of "wet" p-nitrotoluene (0.3% H₂O), 60 lbs. iron, 1 lb. iodine and 20 lbs. PCl₃, was smoothly chlorinated in a jacketed cast iron vessel at 60–65° C. to give a product of freezing point 53° C.

In contrast, the "wet" p-nitrotoluene does not chlorinate under these conditions without PCl₃ present; the reaction is impractically slow or inhibited altogether unless the moisture content is first reduced to less than 0.02%.

*Example III*

By the procedure of Example I, o-nitroluene (28,000 lbs. analyzing 0.02% water), anhydrous ferric chloride (350 lbs.), iodine (15 lbs.) and PCl₃ (50 lbs., representing about 3 times the stoichiometric quantity) was smoothly converted at 40–50° C. to a monochlorinate" of specific gravity 1.32 at 25° C.

When the phosphorus trichloride is omitted in the above procedure, the chlorination is erratic and usually about 30% slower.

As many apparently widely different embodiments of this invention may be made without departing from the spirit and scope thereof, it is to be understood that the invention is not limited to the specific embodiments thereof except as defined in the appended claims.

I claim:

1. In the process of chlorinating a nitro aromatic hydrocarbon in the nucleus wherein chlorine is introduced into said nitro aromatic hydrocarbon in the presence of a nuclear chlorination catalyst, said nitro aromatic hydrocarbon containing up to about 0.5% contaminating water, based on said nitrobody, the amount of said water present being sufficient to retard said nuclear chlorination, the improvement which comprises adding to said nitro aromatic hydrocarbon an amount of phosphorus chloride sufficient to overcome the chlorination retarding influence of said contaminating water.

2. The process of claim 1 wherein the phosphorus chloride is present in an amount from about 2.5 to 7.5 parts per part of said contaminating quantity of water.

3. In the process of chlorinating nitrobenzene in the nucleus wherein chlorine is introduced into said nitrobenzene in the presence of a nuclear chlorination catalyst, said nitrobenzene containing up to about 0.5% contaminating water, based on said nitrobody, the amount of said water present being sufficient to retard said nuclear chlorination, the improvement which comprises adding to said nitrobenzene an amount of phosphorus trichloride sufficient to overcome the chlorination retarding influence of said contaminating water.

4. In the process of chlorinating nitrotoluene in the nucleus wherein chlorine is introduced into said nitrotoluene in the presence of a nuclear chlorination catalyst, said nitrotoluene containing up to about 0.5% contaminating water, based on said nitrobody, the amount of said water present being sufficient to retard said nuclear chlorination, the improvement which comprises adding to said nitrotoluene an amount of phosphorus trichloride sufficient to overcome the chlorination retarding influence of said contaminating water.

5. In the process of chlorinating a nitro aromatic hydrocarbon in the nucleus wherein chlorine is introduced into said nitro aromatic hydrocarbon in the presence of a nuclear chlorination catalyst, said nitro aromatic hydrocarbon containing up to about 0.5% contaminating water by weight of said nitro aromatic hydrocarbon, the amount of said water present being sufficient to retard said nuclear chlorination, the improvement which comprises adding to said nitro aromatic hydrocarbon up to about 4% phosphorus chloride by weight of said nitro aromatic hydrocarbon, the amount of said phosphorus chloride being sufficient to overcome the chlorination retarding influence of said contaminating water.

6. The process of claim 5 wherein the phosphorus chloride is phosphorus trichloride present in an amount from about 2.5 to 7.5 parts per part of said contaminating amount of water.

7. The process of claim 5 wherein the nitro aromatic hydrocarbon is nitrobenzene.

8. The process of claim 5 wherein the nitro aromatic hydrocarbon is o-nitrotoluene.

9. The process of claim 5 wherein the nitro aromatic hydrocarbon is p-nitrotoluene.

References Cited in the file of this patent

Smith: "College Chemistry," pp. 373–74 (1946), D. Appleton-Century Co., Inc. (Copy in Scientific Library.)

Degering: "An Outline of Organic Nitrogen Compounds," p. 138 (Sect. 430) (1950), University Lithoprinters. (Copy in Scientific Library.)